(12) United States Patent
Borkenhagen et al.

(10) Patent No.: US 9,338,528 B2
(45) Date of Patent: May 10, 2016

(54) OPTIMAL POSITIONING OF REFLECTING OPTICAL DEVICES

(71) Applicant: GlobalFoundries Inc., Grand Cayman (KY)

(72) Inventors: John M. Borkenhagen, Rochester, MN (US); Eugen Schenfeld, South Brunswick, NJ (US); Mark Z. Solomon, Poughkeepsie, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 65 days.

(21) Appl. No.: 13/945,268

(22) Filed: Jul. 18, 2013

(65) Prior Publication Data

US 2015/0023661 A1 Jan. 22, 2015

(51) Int. Cl.
*H04Q 11/00* (2006.01)

(52) U.S. Cl.
CPC ....... *H04Q 11/0005* (2013.01); *H04Q 11/0062* (2013.01); *H04Q 2011/003* (2013.01); *H04Q 2011/009* (2013.01); *H04Q 2011/0026* (2013.01); *H04Q 2011/0049* (2013.01)

(58) Field of Classification Search
USPC .......................................................... 398/45
See application file for complete search history.

(56) References Cited

U.S. PATENT DOCUMENTS

| | | | |
|---|---|---|---|
| 6,507,421 B1 | 1/2003 | Bishop et al. | |
| 6,539,142 B2 | 3/2003 | Lemoff et al. | |
| 6,567,574 B1 * | 5/2003 | Ma | H04Q 11/0005 385/16 |
| 6,701,038 B2 | 3/2004 | Rensing et al. | |
| 6,975,788 B2 | 12/2005 | Basavanhally et al. | |
| 6,985,271 B2 | 1/2006 | Yazdi et al. | |
| 7,155,125 B2 | 12/2006 | Mori | |
| 7,734,127 B2 * | 6/2010 | Korevaar | G02B 6/359 385/15 |
| 8,014,640 B2 | 9/2011 | Xia et al. | |
| 8,121,478 B2 | 2/2012 | Kash et al. | |
| 8,208,771 B2 | 6/2012 | Ikeda et al. | |
| 2005/0117838 A1 * | 6/2005 | Okada | G02B 6/359 385/18 |
| 2006/0198583 A1 * | 9/2006 | Oikawa | H04Q 11/0005 385/53 |
| 2009/0169206 A1 | 7/2009 | Friedrich | |
| 2009/0323149 A1 * | 12/2009 | Mizukami | G02B 6/2931 359/221.2 |
| 2010/0074615 A1 * | 3/2010 | Kondo | H04B 10/0793 398/38 |
| 2010/0195183 A1 | 8/2010 | Sakai et al. | |
| 2010/0234035 A1 | 9/2010 | Fujishima et al. | |

FOREIGN PATENT DOCUMENTS

| | | |
|---|---|---|
| JP | 2002031767 A | 1/2002 |
| JP | 2004271977 A | 9/2004 |

(Continued)

OTHER PUBLICATIONS

Marin Soljačić et al., "All-optical switching using optical bistability in non-linear photonic crystals", Proceedings of SPIE vol. 5000 (2003) ©, 2003 SPIE.

(Continued)

*Primary Examiner* — David Payne
*Assistant Examiner* — Omar S Ismail
(74) *Attorney, Agent, or Firm* — Michael J. LeStrange, Esq.

(57) ABSTRACT

Reflecting optical devices are optimally positioned by an all optical switch in an optically-connected system by transmitting optical power readings taken from an optimal monitoring module that are transmitted to the all optical switch for optimal positioning of a reflecting optical device in order to produce maximum optical output power.

15 Claims, 5 Drawing Sheets

(56) References Cited

FOREIGN PATENT DOCUMENTS

| JP | 2005189548 A | 7/2005 |
|----|--------------|--------|
| JP | 2008072201 A | 3/2008 |
| JP | 2008181149 A | 8/2008 |
| JP | 2010183272 A | 8/2010 |
| WO | 2004015439 A1 | 2/2004 |

OTHER PUBLICATIONS

Gholam-Mohammad Parsanasab et al., "Integrated Polymeric All-Optical Switch", Journal of Lightwave Technology, vol. 29, No. 18, Sep. 15, 2011.

Tze-Wei Yeow, et al., "MEMS Optical Switches", IEEE Communications Magazine, Nov. 2001.

Robert Keil , "All-optical routing and switching for three-dimensional photonic circuitry", Scientific Reports, Published Sep. 15, 2011.

K. H. Craig et al., "All-Optical Switching in Prism Coupling to Semiconductor-Doped Glass Waveguides", Electronics Letters, vol. 23 No. 10, May 7, 1987.

PCT Written Opinion From the International Searching Authority, International No. PCT/JP2014/003087, Dated August 26, 2014, pp. 1-4.

PCT International Search Report From the International Searching Authority, International No. PCT/JP2014/003087, Dated August 26, 2014, pp. 1-4.

PCT International Preliminary Report on Patentability From the International Bureau, International No. PCT/JP2014/003087, Dated January 28, 2016 pp. 1-6.

* cited by examiner

OPTIMAL POSITIONING OF REFLECTING OPTICAL DEVICES

BACKGROUND OF THE INVENTION

1. Field of the Invention

The present invention relates generally to computer systems, and more particularly to optimal positioning of reflecting optical devices by an all optical switch in an optically-connected system of a computing environment.

2. Description of the Related Art

In today's society, computer systems are commonplace. Computer systems may be found in the workplace, at home, or at school. Computer systems may include data storage systems, or disk storage systems, to process and store data. Generally, computer systems are designed to accept and execute various application programs provided by a User, using an operating system to manage the computer resources required to execute the application programs. Trends towards increased performance of computer systems often focuses on telecommunication using optical fibers and/or integrated optical circuits (IOCs). As such, a need exits for increasing the efficiency and productivity of an optically connected network.

SUMMARY OF THE INVENTION

In one embodiment, a method is provided for optimally positioning reflecting optical devices by an all optical switch in an optically-connected system of a computing environment. In one embodiment, by way of example only, reflecting optical devices are optimally positioned by an all optical switch in an optically-connected system by transmitting optical power readings taken from an optimal monitoring module that are transmitted to the all optical switch for optimal positioning of a reflecting optical device in order to produce maximum optical output power.

In another embodiment, a computer system is provided for optimally reflecting optical devices by an all optical switch in an optically-connected system using at least one processor device, in a computing environment. The computer system includes a computer-readable medium and a processor in operable communication with the computer-readable medium. In one embodiment, by way of example only, the processor optimally positions reflecting optical devices by an all optical switch in an optically-connected system by transmitting optical power readings taken from an optimal monitoring module that are transmitted to the all optical switch for optimal positioning of a reflecting optical device in order to produce maximum optical output power.

In a further embodiment, a computer program product is provided for optimally positioning reflecting optical devices by an all optical switch in an optically-connected system using at least one processor device, in a computing environment. The computer-readable storage medium has computer-readable program code portions stored thereon. The computer-readable program code portions include a first executable portion that optimally positions reflecting optical devices by an all optical switch in an optically-connected system by transmitting optical power readings taken from an optimal monitoring module that are transmitted to the all optical switch for optimal positioning of a reflecting optical device in order to produce maximum optical output power.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
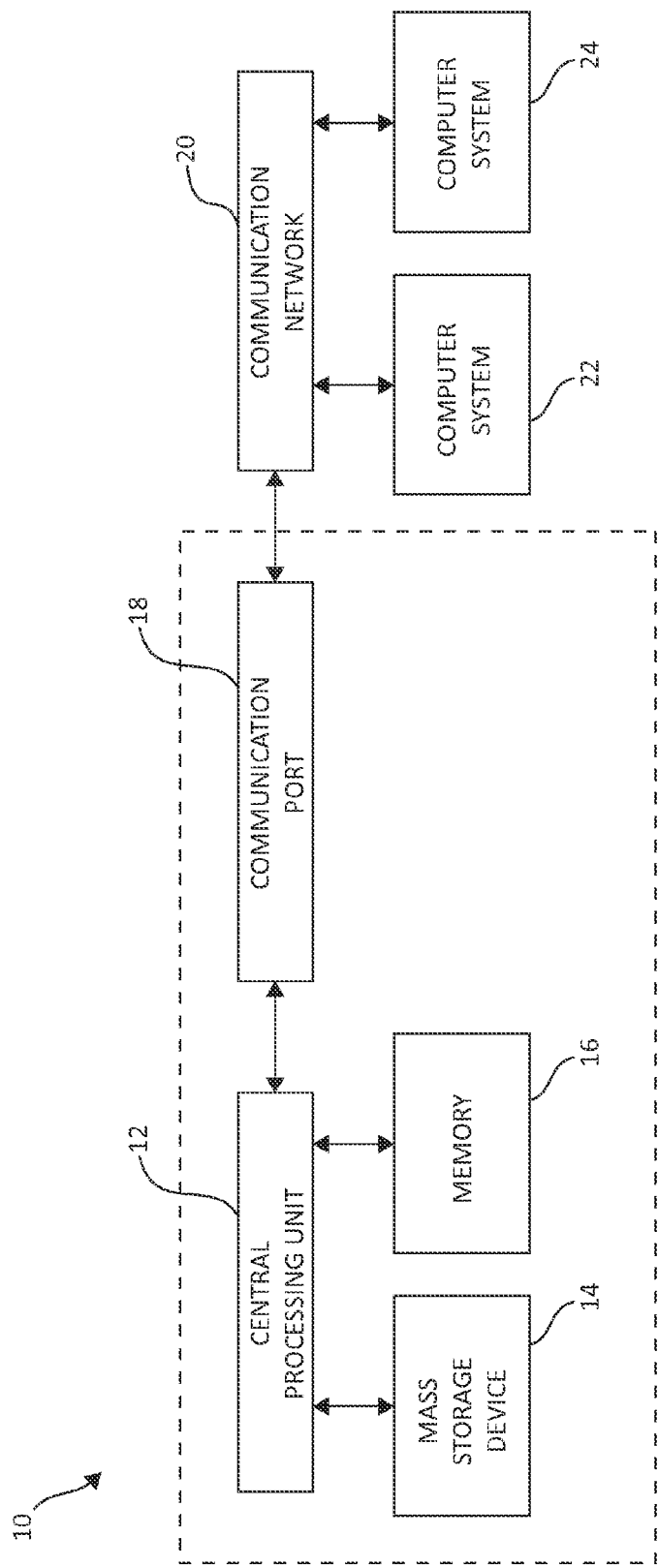
FIG. 1 is a block diagram illustrating a computing system environment having an example storage device in which aspects of the present invention may be realized.

In one embodiment, as described herein, an optical network consists of a network where optical fiber serves as the fundamental medium of transmission. However, switching, signaling and processing functions are accomplished electronically. In one embodiment, an optical switch is a switch that accepts a photonic signal at one of its ports and send it out through another port based on the routing decision made. In one embodiment, an all-optical switch may be used, where the switching fabric is performed purely through photonic means.

In one embodiment, a variety of applications may use the optical switching devices. For example, in one embodiment, the optical switches are used in high speed optical networks. In one embodiment, the optical switches may also be used for protection switching. If a fiber fails, the switch allows the signal to be rerouted to another fiber before the problem occurs. However, this operation must take milliseconds, including the time required to detect the failure, inform the network and the actual switching time.

In one embodiment, a Micro Electrical Mechanical System (MEMS) is an all optical device and is a wavelength switching technique without initial electronic conversion. In one embodiment, the MEMS devices may be miniscule mechanisms made from silicon, with many moving mirrors ranging from a few hundred micrometers to a few millimeters. These MEMS mirrors may exist on a silicon wafer and may be packed as an array. The optical switch works by deflecting light waves from one port to another through these mirrors. In one embodiment, there may be employed at least two types of MEMS mirror structures; the 2D mirror and the 3D mirror. In one embodiment, the 2D mirror has two states, one where the light pass over the mirror without deflecting it, and another where the mirror pops up and the beam is deflected into another output port. However, in the 3D mirror, the optical switch works by using two arrays of beam steering mirrors. Each mirror is fixed to flexures within 2 frames, which allow the mirror to rotate in any direction.

For example, using the 3D mirror as a simple explanation, if a signal needs to be sent from port i to port j, mirrors i from the first array and mirror j, from the second array will point to each other. Light sent through port i will then have a direct path to port j (see similar description in FIG. 3 and FIG. 4). However, if the signal needs to be switched to port k, the beam is scanned from mirror j to mirror k, passing over the other mirrors in between. Crosstalk is avoided in these circumstances, as a connection is only established when the mirrors are facing each other.

In one embodiment, an all optical switches may operate by mechanical means, such as physically shifting an optical fiber to drive one or more alternative fibers, and/or may be based on mechanical movements of devices (such as MEMS created mirrors) that reflect an input light beam to an output location out of many. In one embodiment, the all optical switches may use a feedback loop to optimally position such devices. However, current implementations of optical switches, tap out part of the light from the input and the output locations (e.g., diverting some of the signal being transmitted in the core of the fibre into another fibre or a detector), and, in one embodiment, some monitoring mechanism is used that indicates the relative light power input and an output locations. The monitoring system, attempts, through various positioning algorithms, to move the reflecting device, such that maximum output light power is detected. In large switches, these optical taps of input and output and the measuring of relative optical power done by the monitoring mechanism, is expansive. Other optical switch designs, use a separate light source (with a different wavelength for example, 850 nm is used for positioning of reflecting devices that carry 1.3 um or 1.5 um optical signals in fibers). But such a source is also coupled in part into the optical input and extracted out of the output (if different wavelength, this can be done with wavelength based filtering).

Currently, in the all optical switches made with MEMS mirrors, the precise positioning of these mirrors, which reflect light from input fibers to output fibers, requires tapping of partial optical power from those fibers. This tapping takes part of the input and output optical power from each fiber, to be measured by an optical power monitor, which forms the feedback loop algorithm for an optimal mirror positioning. The tapping can either be done by partial power tapping or by wavelength tapping if different wavelengths are used for the positioning system. In both such cases, the tapping and the optical power monitors needed, are a substantial fraction of the cost of making such switches (e.g. 70%). Moreover, tapping the fibers further complicates the current challenge since precise positioning of all optical switches relies on an optical power feedback loop and the input and output fibers are tapped for a percentage of optical power that needs to be measured. Moreover, the initial positioning of the deflection (mirrors, fibers/piezoelectric) is based on factory calibrated table and various algorithms are used to achieve maximum optical power relative to input, avoiding local maxima. Moreover, the optical power tapping is expensive requiring splitting of 100s of input/output fibers. For example, each input and output fiber has a Y tap to extract a small percentage of the light in that fiber. Such split contributes significantly to the overall cost of an optical switch. Each one of the input/output fiber optical tapped power, needs to be measured, and also 70%-80% of the optical switch cost is due to the optical close loop tapping and monitoring operations.

However, the present invention provides a solution for the elimination of these taps and optical monitoring mechanism achieving a cheaper, simpler optical switch when such a switch is integrated in a system. The present invention will greatly simplify such optical switches, particularly when integrated within a particular server (e.g., an STG servers) such as in a backplane, resulting in cheaper cost and eliminating redundancy of system functions.

In one embodiment, as described herein, the integrated all optical switch, that is used within a system, employs optical transceivers and uses the power levels of transceivers and/or receivers, and uses a optimal positioning monitoring system (e.g., which may be controlled by a systems management software). In one embodiment, power readings, possibly done in bursts of every few 100s microseconds at first, that are taken by the optical transceivers and/or optical receivers, are used to initially position the reflecting optical device in an optimal position (maximum optical output power). Subsequently, as a maintenance operation, the power readings are taken by the optical transceivers every few seconds, every tens of seconds, and/or some predefined time sequence interval, and the read bursts of optical power levels are then used to prevent position drifting of a reflective device (e.g., the MEMS mirror) and getting out of the optical maximum power reflected to the desired location. The optical power readings of all transceivers and/or optical receivers that are connected to the optical switch may be aggregated, collected, and/or transmitted to an optical switch control processor to compute the needed adjustments of the optical reflecting devices. In this way, the present invention eliminates the need of optical tapping and separate optical monitoring units, which are expansive, and complicates the optical switch. Thus, the present invention avoids tapping out part of the light from the input and the output locations (e.g., diverting some of the signal being transmitted in the core of the fibre into another fibre or a detector). Significant cost savings is achieved and is greatly reduced, as well as having such a system embedded switch become much more simpler and reliable.

In one embodiment, the present invention employs optical switches within a system that has transceivers that use a variety of technology (e.g., IBM® Nanophotonics technology). Since such transceivers already have optical power tapping and reading operations, such transceivers and components are used and configured thereby eliminating the need for optical power tapping the optical switch.

In one embodiment, the readings of optical power levels may occur periodically, every few seconds, and/or at some other preferable time sequence interval. Such power level readings may be of various sizes. For example, in one embodiment, the optical switches have two phases of operation for ensuring the optimal positioning of a reflecting device (e.g., MEMS mirrors); 1) an initial placement, and 2) a maintaining placement. In other words, the optical switch operation is to 1) initially position all mirrors of the switch to connect pairs of input output ports as needed and 2) to keep such positioning from drifting with time due to a variety of factors such as bit-error-ratio (BER), temperatures, and/or movements, etc.). For example, in one embodiment, in the initial placement, a stream of 10-20 readings of power levels at an interval of 50-100 uSec, is taken from each input and output. Such power level readings are then fed into a placement algorithm of the optical switching device, and then tries to move the MEMS mirrors to maximize power coupling into the desired output fiber. The maintaining placement is needed to prevent drift of the positioning mirror with time. Such is done over longer periods, seconds, minutes, and/or some other time interval sequence, and the power level readings are then used to correct any move/drift of the MEMS mirrors.

In one embodiment, the present invention uses the built in optical power monitoring module included already in each optical transmitter and optical receiver (e.g., optical transmitters and optical receivers used for troubleshooting purposes) to replace the need for tapping couplers on each fiber, and for the optical monitoring units to convert such optical power into data to be used by the optical switch positioning system. In a multi computation node system connected in a rack by such an optical switch, the interfacing servers will transmit to the optical switch controller the readings from all the input and output fibers. The controller will use such reading with the positioning algorithm for optimal placement of the MEMS mirrors.

In one embodiment, each optical switch is calibrated, such as in a fabrication lab when assembled, and the relative coarse positioning of the reflecting devices (e.g. MEMS mirrors) is stored with the switch control plane (e.g. in a flash memory). As the switch starts its operation and/or is active to become operation, and accepts a request to connect optical inputs to optical outputs, the existing optical transmitters and optical receivers in the system are read for obtaining the optical power levels, and such power levels are transmitted to the optical switch control plane. Such power level readings may be taken every 100s uSec, but then may be taken less often to compensate for positioning drift with time. The systems control plan, which has access to reading optical power of transceivers, aggregate such multiple readings and transmit them to the switch control plan as needed. In one embodiment, there is an agreed protocol between the optical switch control plan and the system control plan to provide needed readings either per request, periodically, and/or some other time interval sequence, such that the reflecting devices can be positioned in the most optimal locations.

Thus, the present invention provides for simpler manufacturing because the optical switch is a main MEMS deflection mechanism with a simpler controller without any need for connecting optical monitoring units and splitting fibers for the in and out ports. Moreover, automatic manufacturing is more easily achieved since there is no splitting of fibers needed thereby providing increased reliability.

Thus, as described herein, the power monitoring operation existing in the optical transceivers and/or optical receivers are included with no need to tap the fibers at the optical switch, and there are no fiber splitters. Moreover, the present invention eliminates the need for a separate optical power measurement mechanism handling 100s of different fibers. In one embodiment, the present invention matches Silicon Photonics with output monitor optical diode and power coupling and measuring. In one embodiment, optical reading occurring at each node (input/output) are locally sent to the switch control plane. In one embodiment, an optical switch control plan using a 1 G Ethernet and/or similar link, provides enough bandwidth to transmit the readings. Each closed optical control loop distributed among multiple nodes connected to the optical switch provide readings of its corresponding input/output fibers optical power. An optical switch control plane uses these readings in the control loop to adjust the positioning of the mirrors. In one embodiment, an event based detection function is used as an option for detecting whether one or more of the reflecting devices (e.g., the MEMS mirrors) is no longer in the optimal positioning for producing the maximum optimal power. For example, if a link BER falls below a set threshold and/or a set of thresholds (e.g., each factor may have an individual threshold), which may be set at any numerical value based on the particular factor (or any other of the variety of factors such as the bit-error-ratio (BER), temperatures, and/or movements) the link can initiate corrective mirror positioning request. Moreover, the optical switch will get the power readings of that link and adjust positioning back to the maximum optical power.

In one embodiment, the present invention provides for optimally positioning reflecting optical devices by an all optical switch in an optically-connected system of a computing environment. In one embodiment, by way of example only, reflecting optical devices are optimally positioned by an all optical switch in an optically-connected system by transmitting optical power readings taken from input fibers and output fibers of and/or by optical transceivers and/or optical receivers to the all optical switch. The optical power readings that are transmitted to the all optical switch are used for optimally positioning each of the reflecting optical devices associated with the all optical switch for connecting at least one input port to at least one output port for producing maximum optical output power.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
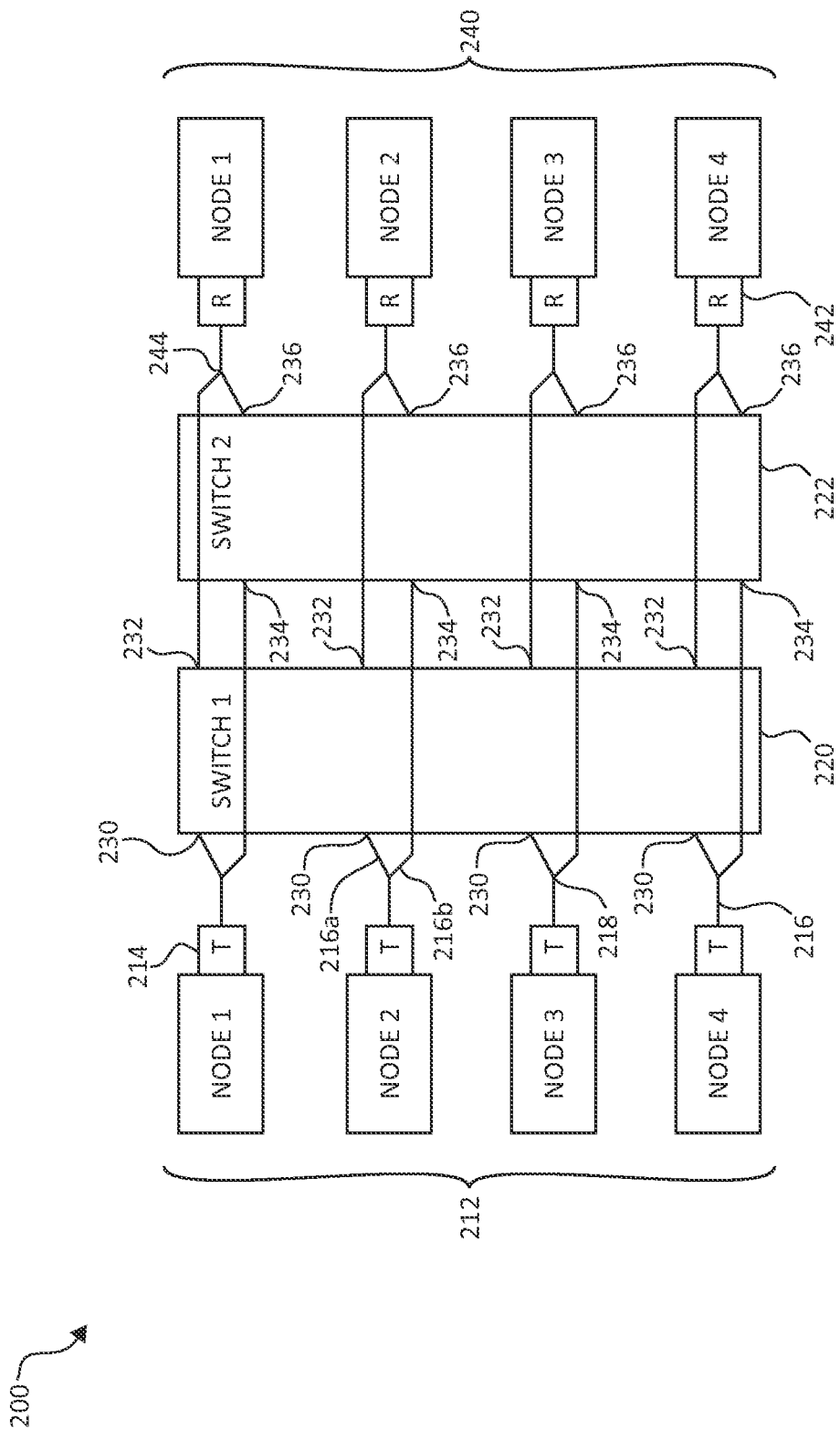
FIG. 2 is a block diagram illustrating a hardware structure of an optical switching system in which aspects of the present invention may be realized.

With reference to FIG. 2, an optical switching system 210 includes a multiplicity of transmit, single channel nodes 212 (labeled Node 1, Node 2, Node 3 and Node 4) each of which includes an optical transmitter 214 capable of transmitting an optical signal 216 on a single channel. Optical signal splitters 218 may receive the transmitted optical signals and split the transmitted signal 216 into two half-power signal portions 216a, 216b.

A first optical switch 220 and a second optical switch 222 are provided to receive the signal portions 216a, 216b. The first and second optical switch 20, 22 can be any optical switches that can receive an optical signal and route the received optical signal to a desired output of the optical switch. The two switches 220, 222 may be the same type of optical switch that have identical switching functionality. For example, each switch 220, 222 could be, for example, a semiconductor optical amplifier (SOA), micro electro-mechanical systems (MEMS), or other type of optical switch.

Alternatively, the two switches 220, 222 can be different types of optical switches that have distinct switching functionality from one another. For example, the switch 220 may have a faster switching speed, but use higher power, for example a SOA, than the other optical switch 222, which operates more slowly but at lower power, for example a MEMS.

The switch 220 includes one or more optical inputs 230 connected to the optical signal splitters 218 and receiving the first optical signal portions 216a. The switch 220 also includes one or more optical outputs 232. Each input 230 is selectively connectable to any one of the outputs 232 so that the signal portion 216a received by an input 230 can be routed to any one of the outputs 232. As would be understood by a person of ordinary skill in the art, the switching of the switch 220 (and of the switch 222) would be controlled by suitable control logic based on the intended destination of the signal 216.

Likewise, the second optical switch 222 includes a multiplicity of optical inputs 234 connected to the optical signal splitters 218 and receiving therefrom the second optical signal portions 216b. The switch 222 also includes a multiplicity of optical outputs 236. Each input 234 is selectively connectable to each of the outputs 236 so that the signal portion 216b received by an input 234 can be routed to any one of the outputs 236.

Downstream of the switches 220, 222 are a multiplicity of receive nodes 240 (labeled Node 1, Node 2, Node 3 and Node 4). Each receive node 240 includes an optical signal receiver 242 capable of receiving an optical signal. Optical signal combiners 244 are connected to the receivers 242 and to one of the outputs 232 of the switch 220 and one of the outputs 236 of the switch 222. The optical signal combiners 244 can receive both signal portions 16a, 216b and combine them back into the transmitted signal 216 which is then input into the respective receiver 42 of the receive node 40.

In the system 210, if one of the switches 220, 222 fails, the system 210 is still able to route the optical signal to the appropriate receive node 240. However, the receive node would receive only half of the originally transmitted signal 216, i.e. either signal portion 216a or 216b depending upon which switch fails. The sensitivity of the receivers 242 is such as to allow receipt of the combined signal portions 216a, 216b or just an individual signal portion 216a, 216b.

Although four transmit nodes (e.g., transmitters) and four receive nodes (receivers) are illustrated, the system 210 could be implemented with a larger or smaller number of transmit and receive nodes. In addition, although the transmit nodes are described as having transmitters 214 and the receive nodes as having receivers 242, transceivers could be used in place of the transmitters and/or the receivers to allow the transmit nodes and the receive nodes to transmit and receive.

Moreover, the configuration of the above FIG. 2 description may be included in an optically connected system, having a CPU (see FIG. 1) and a memory (see FIG. 1) with servers connected through optical links and at least one switching fabric. Each of the processors, processor blades, memory, and/or memory blades (not shown), may be included and share a number of optical external links. These external links are made for optimizing a point-to-point connection within the optical-switching fabric at very high bandwidth. This optimization may be in the physical implementation used, in the protocol chosen to facilitate such high bandwidth and has the ability to support memory switching within one physical link or multiple physical links to look like one high bandwidth physical link made of a few physical links. Since these external links are circuit switched, via at least one optical switch, data or content of such, these should use a very lightweight communication protocol.

Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. These external links are common to all memory blades and processor blades.

It should be noted that at least one optical circuit switch is shared between the optical external links. Also, several independent circuits may be established between the processors and the servers (e.g., memory blades) sharing the optical circuit switch. These external links are made for optimizing a point-to-point connection at very high bandwidth. This optimization may be in the physical implementation used, in the protocol chosen to facilitate such high bandwidth and has the ability to support aggregation of multiple streams within one physical link or multiple physical links to look like one high bandwidth physical link made of a few physical links. Since these external links are circuit switched, via an all optical switch that will not be aware of the protocol, data or content of such, these should use a very light weight communication protocol. Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. These external links are common to all processors, blades, memory, and independent circuits, such that any memory blade/processor blade may pass information on one or all of these external links, either directly or by passing through the interconnected processor blades. In one exemplary embodiment, circuit-switching switches are used. Circuit switching switches do not need to switch frequently, and thus may be much simpler to build, and can use different technologies (e.g., all optical, MEMS mirror based) to dynamically connect between the circuits, memory, and processor blades.

Figure 3:
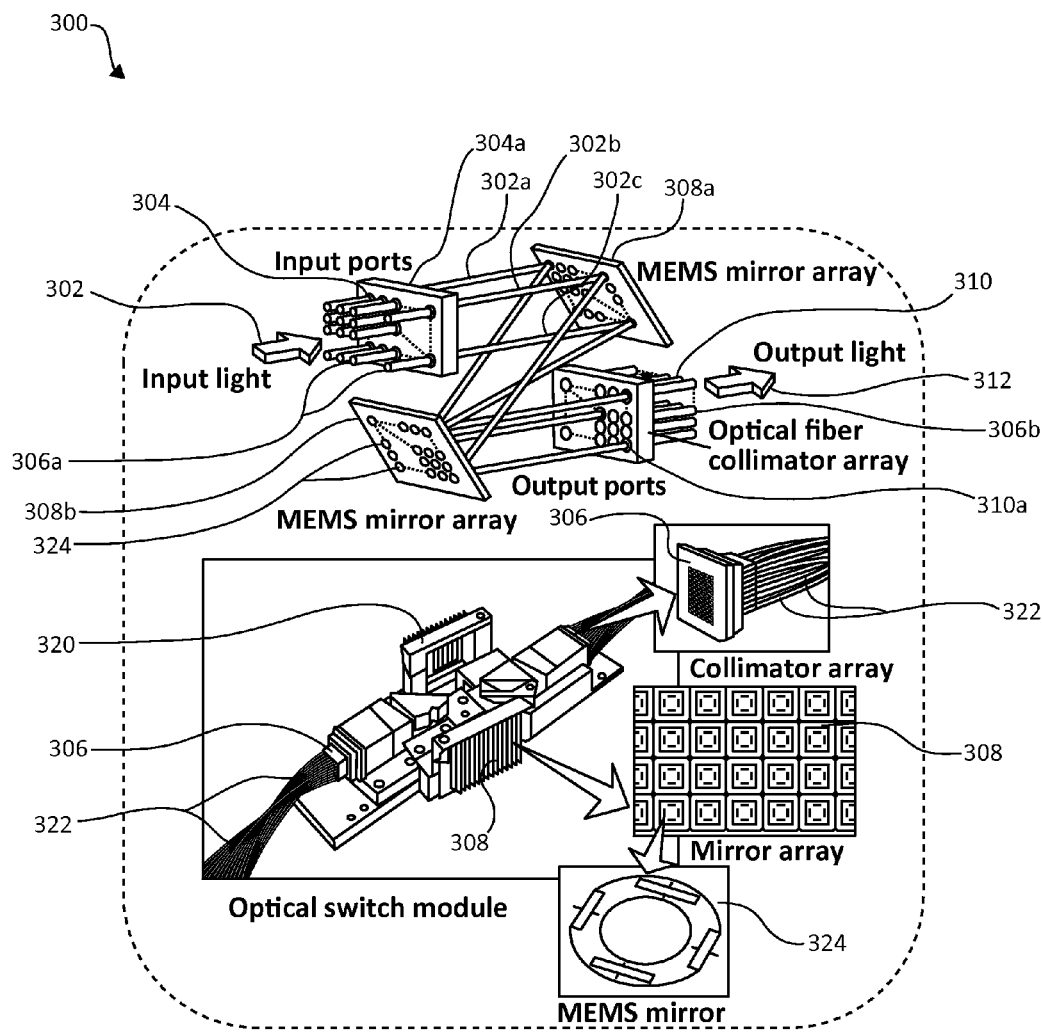
FIG. 3 is a block diagram illustrating a hardware structure of a three dimensional (3D)-MEMS optical switch in which aspects of the present invention may be realized.

Turning now to FIG. 3, FIG. 3 is a block diagram 300 showing a hardware structure of a three dimensional (3D)-MEMS optical switch in which aspects of the present invention may be realized. As illustrated in FIG. 3, a MEMS optical switch 320, a MEMS micro-mirror 324 is used to reflect a light beam 302, 312 (e.g., input light shown as 302A-C, and/or output light). The direction in which a light beam, such as the input light 302 going into the input ports 304 via optical fibers 322, is reflected can be changed by rotating the mirror 324 (e.g., a mirror 324 as part of the MEMS mirror array 308A and/or 308B) to different angles, allowing the input light input light 302 to be connected to any output port 210, where the output ports are then connected to optical fibers 322. The input ports 304 and the output ports 310 may be included in an optical fiber collimator array 306 (shown as 306A and 306B). For example, input light 302A is sent into the input port 304A and is reflected off mirrors 324 included with the MEMS mirror arrays 308A and/or 308B. The reflected input light 302A is then sent to the output ports 310A.

Figure 4:
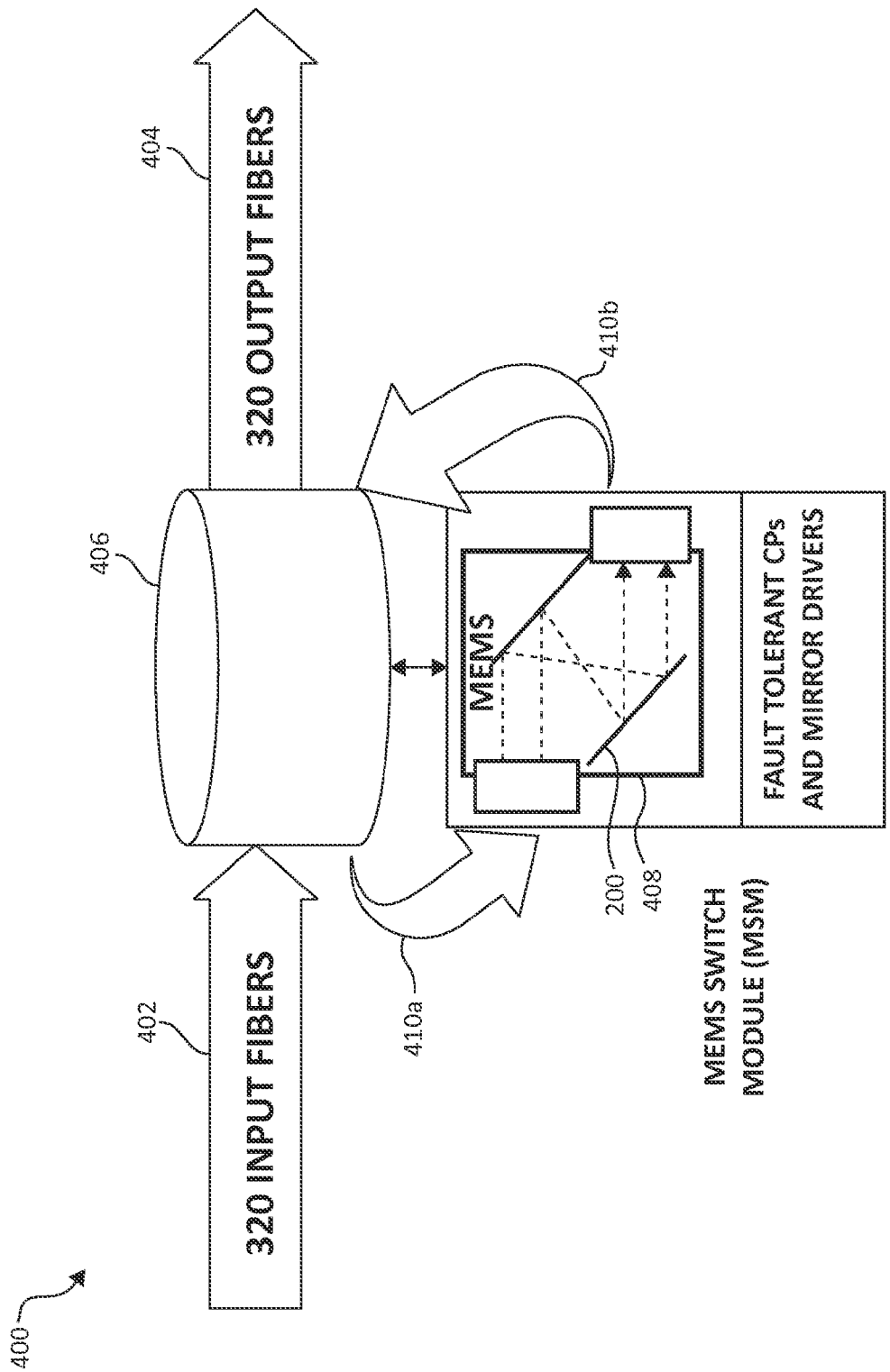
FIG. 4 is a block diagram illustrating a hardware structure of an optical switch using a three dimensional (3D)-MEMS optical switch and an optical monitoring module in which aspects of the present invention may be realized.

Turning now to FIG. 4, FIG. 4 is a block diagram 400 showing a hardware structure of an optical switch using a three dimensional (3D)-MEMS optical switch and an optical monitoring module in which aspects of the present invention may be realized. As illustrated in FIG. 4, in one embodiment, by way of example only, input fibers 402 (e.g., 320 input fibers) and output fibers 404 are connected and/or in association with an optical monitoring module (OMM) 406. In one embodiment, an MEMS optical switch module 408, may include the elements and components described above, specifically FIG. 3. As illustrated in FIG. 4, the MEMS optical switch module 408 includes the MEMS micro-mirror (see FIG. 3 324) is used to reflect a light beam 410A and 410B. The direction in which a light beam 410, such as the input light (see FIG. 3 302) going into the input ports (see FIG. 3 304) via optical fibers (see FIG. 3 322), is reflected can be changed by rotating the mirror (see FIG. 3 324) (e.g., a mirror as part of the MEMS mirror array and/or) to different angles, allowing the input light input light (see FIG. 3 302) to be connected to any output port (see FIG. 3 310), where the output ports are then connected to optical fibers (see FIG. 3 322). In one embodiment, the optical monitoring module (OMM) 406 is part of the nodes (see FIG. 2 212) and/or optical transceivers and/or optical receiver, and the power readings are sent to the MEMS optical switch module 408. In one embodiment, the a light beam 410A and 410B may be transmitted both to and from the optical monitoring module (OMM) (or also referred herein as optical power monitoring module) 406 and to and/or from the MEMS optical switch module 408. In one embodiment, the optimal monitoring module 406 transmits optical power readings taken from each of the input fibers/output fibers of and/or by each of the optical transceivers (see FIG. 2) to the all optical switch 408. In one embodiment, the OMM 406 includes each optical transceiver and/or receiver that are in place and measuring the power levels of the input and output fibers. Alternatively, in one embodiment, the OMM 406 may be included in each optical transceiver and/or receiver that are already in place and measuring the power levels of the input and output fibers. For example, optical power monitoring module 406 may be included already in each optical transmitter and receiver (e.g., used for troubleshooting purposes) to replace and eliminate the need for tapping couplers on each fiber, and for the optical monitoring units to convert such optical power into data to be used by the optical switch positioning system. It should be noted that the OMM 406 may be a hardware device and/or software device in connection with a processor device used to measure the power in an optical signal. In one embodiment, the OMM 406 may consist of calibrated sensors measuring power. The sensor may consist of a photodiode selected for the appropriate range of wavelengths and power levels. The OMM 406 may be included as part of the transceivers and receives. The optical power readings that are transmitted to the all optical switch 408 are used for optimally positioning each of the reflecting optical devices associated with the all optical switch for connecting at least one input port to at least one output port for producing maximum optical output power. A control processor may be used to control, assist, and/or operate the optical monitoring module (OMM) 406 of the computing nodes (see FIG. 2) and/or the MEMS optical switch module 408 for performing the embodiments described herein.

Figure 5:
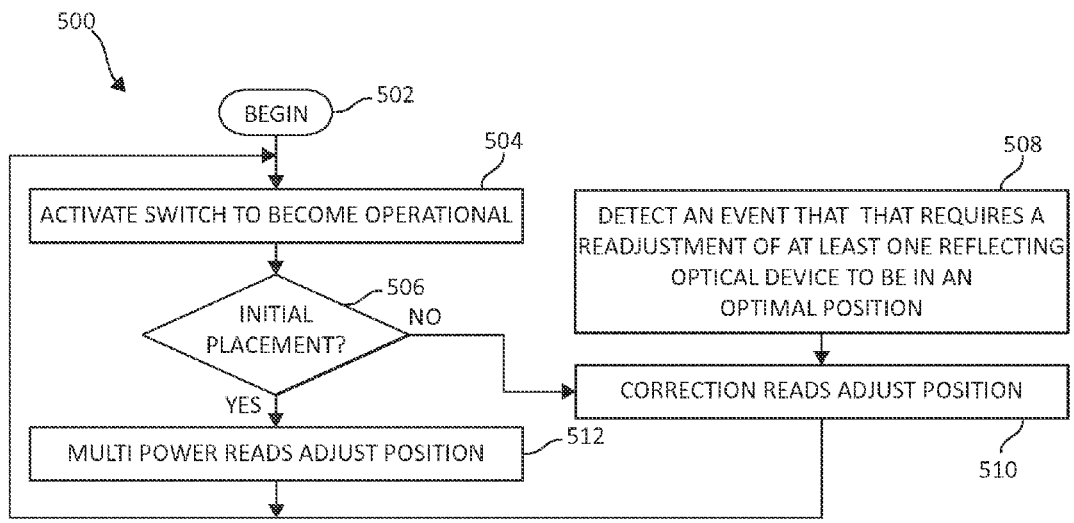
FIG. 5 is a flow chart diagram illustrating an exemplary method for optimal positioning of reflecting optical devices by an all optical switch in an optically-connected system in which aspects of the present invention may be realized.

FIG. 5 is a flow chart diagram illustrating an exemplary method 500 for optimal positioning of reflecting optical devices by an all optical switch in an optically-connected system in which aspects of the present invention may be realized. The method 500 begins (step 502) with an optical switch becoming active (e.g., the method 500 activates the optical switch to become active for optimally positioning one or more reflecting optical devices) (step 504). The method 500 determines if optimal positioning of reflecting optical device is an initial placement (e.g., an initial optimal placement of the reflecting optical device) (step 506). In other words, the method 500 determines if this is the initial optimal positioning of the reflective optical device (e.g., installation of the reflective optical device in the optically-connected system) as compared to a first, second, and/or nth optimal positioning after the initial optimal positioning reflective optical device. If the method 500 determines this is the initial optimal positioning of the reflective optical device, the method 500 takes multiple optimal power reads using transceivers (e.g., from input fibers and/or output fibers) to adjust the reflective optical device to an initial optimal position (step 512). If no, the method 500 detects an event (e.g., following the initial optimal position) that requires a readjustment of at least one reflecting optical device to be positioned in an optimal position for producing maximum optical output power (step 508). The method 500 then takes optimal power correction reads using transceivers and readjusts at least one reflecting optical device for producing maximum optical output power (step 510). The method 500 continues back to step 504 and the optical switch continues to be operational. It should be noted that the optical switch may be dynamically adjusted, dynamically turned off/on according to a variety of factors, predetermined time sequences, and/or other user preferences.

Figure 6:
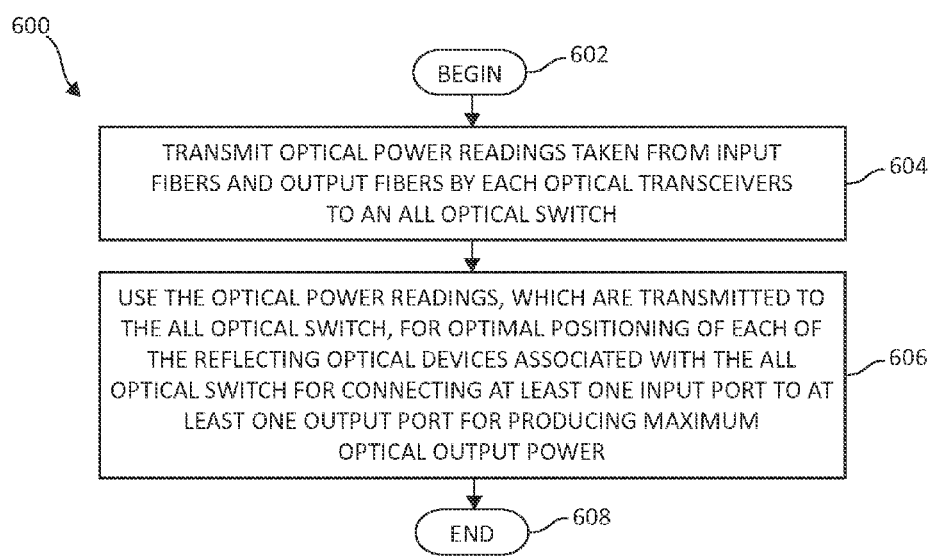
FIG. 6 is a flow chart diagram illustrating an exemplary alternative method for optimal positioning of reflecting optical devices by an all optical switch in an optically-connected system in which aspects of the present invention may be realized.

FIG. 6 is a flow chart diagram illustrating an alternative exemplary method 600 for optimal positioning of reflecting optical devices by an all optical switch in an optically-connected system in which aspects of the present invention may be realized. The method 600 begins (step 602) by transmitting optical power readings taken from input fibers and output fibers by each optical transceivers to the all optical switch (step 604). The method 600 uses the optical power readings, which are transmitted to the all optical switch, for optimal positioning of each of the reflecting optical devices associated with the all optical switch for connecting at least one input port to at least one output port for producing maximum optical output power (step 606). The method 600 ends (step 608).

In one embodiment, the present invention uses optical power readings taken from a optimal monitoring module that are transmitted to the all optical switch for optimal positioning of the reflecting optical device in order to produce maximum optical output power. In one embodiment, the present invention provides for optimally positioning reflecting optical devices by an all optical switch in an optically-connected system of a computing environment. In one embodiment, by way of example only, reflecting optical devices are optimally positioned by an all optical switch in an optically-connected system by transmitting optical power readings taken from input fibers and output fibers of and/or by each of a plurality of optical transceivers and/or optical receivers to the all optical switch. The optical power readings that are transmitted to the all optical switch are used for optimally positioning each of the reflecting optical devices associated with the all optical switch for connecting at least one input port to at least one output port for producing maximum optical output power.

In one embodiment, the present invention transmits the optical power readings to an optical switch controller using an optical control loop function. The reflecting optical devices are microelectromechanical (MEMS) mirrors, and the optically-connected system may be an optically-connected circuit network system. In one embodiment, the present invention initially sets each of the reflecting optical devices in an optimal position for producing the maximum optical output power.

In one embodiment, the present invention detects at least one of the reflecting optical devices is no longer in an optimal position for producing the maximum optical output power based on a variety of factors. The factors may include at least temperature, an input optical power-to-output optical power ratio, any type of movement of at least one of the reflecting optical devices, and/or a bit-error ratio (BER), and then readjusts at least one of the reflecting optical devices to be in the optimal position for producing the maximum optical output power.

In one embodiment, the present invention monitors optical power levels at one of a multiplicity of time intervals for detecting whether an input optical power-to-output optical power ratio has fallen below an optical power threshold.

In one embodiment, the present invention aggregates the optical power readings of each of the plurality of optical transceivers prior to transmitting the optical power readings to the all optical switch. Each of the optical power readings taken from and/or by each of the optical transceivers are periodically performed and/or performed pursuant to a request.

In one embodiment, the present invention uses the optical power readings with a positioning function for calculating the optimal positioning upon accepting a request to connect the at least one input port to the at least one output port for producing maximum optical output power.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for optimal positioning of reflecting optical devices by an all optical switch in an optically-connected system of a computing environment using a processor device, comprising: using optical power readings taken from an optimal monitoring module that are transmitted to the all optical switch for optimal positioning of a reflecting optical device in order to produce maximum optical output power; and transmitting the optical power readings to an optical switch controller using an optical control loop function, wherein the reflecting optical device is a microelectromechanical (MEMS) mirror and the optically-connected system is one of an optically-connected circuit network system and an electrical circuit system and the optimal monitoring module is included in each one of a plurality of optical transceivers and optical receivers; and aggregating the optical power readings of each of a plurality of optical transceivers and optical receivers prior to transmitting the optical power readings to the all optical switch, wherein each of the optical power readings taken by each of the plurality of optical transceivers and optical receivers are periodically performed.

2. The method of claim 1, further including initially setting the reflecting optical device in an optimal position for producing the maximum optical output power.

3. The method of claim 2, further including performing one of: detecting the reflecting optical device is no longer in the optimal position for producing the maximum optical output power based on a plurality of factors, wherein the plurality of factors include at least temperature, an input optical power-to-output optical power ratio, movement of the reflecting optical device, and a bit-error ratio (BER), and readjusting the reflecting optical device to be in the optimal position for producing the maximum optical output power.

4. The method of claim 1, further including monitoring optical power levels at one of a plurality of time intervals for detecting whether an input optical power-to-output optical power ratio has fallen below an optical power threshold.

5. The method of claim 1, further including using the optical power readings with a positioning function for calculating the optimal positioning upon accepting a request to connect at least one input port to at least one output port for producing maximum optical output power.

6. A system, comprising: an all optical switch; a reflecting optical device in communication with the all optical switch; an optimal monitoring module in communication with the all optical switch, an optical switch controller connected to the all optical switch; a plurality of optical transceivers and receivers connected to the all optical switch; and at least one processor device in communication with the all optical switch and the optimal monitoring module, wherein the at least one processor device: using optical power readings taken from the optimal monitoring module that are transmitted to the all optical switch for optimal positioning of the reflecting optical device in order to produce maximum optical output power, and transmits the optical power readings to the all optical switch controller using an optical control loop function, wherein the reflecting optical device is a microelectromechanical (MEMS) mirror and the optimal monitoring module is included in each one of the plurality of optical transceivers and optical receivers, and wherein the at least one processor device aggregates the optical power readings of each of the plurality of optical transceivers and optical receivers prior to transmitting the optical power readings to the all optical switch, wherein each of the optical power readings taken by each of the plurality of optical transceivers and optical receivers are periodically performed.

7. The system of claim 6, wherein the at least one processor device initially sets the reflecting optical device in an optimal position for producing the maximum optical output power.

8. The system of claim 7, wherein the at least one processor device performs one of: detecting the reflecting optical device is no longer in the optimal position for producing the maximum optical output power based on a plurality of factors, wherein the plurality of factors include at least temperature, an input optical power-to-output optical power ratio, movement of the reflecting optical device, and a bit-error ratio (BER), and readjusting the reflecting optical device to be in the optimal position for producing the maximum optical output power.

9. The system of claim 6, wherein the at least one processor device monitors optical power levels at one of a plurality of time intervals for detecting whether an input optical power-to-output optical power ratio has fallen below an optical power threshold.

10. The system of claim 6, wherein the at least one processor device uses the optical power readings with a positioning function for calculating the optimal positioning upon accepting a request to connect at least one input port to at least one output port for producing maximum optical output power.

11. A computer program product for optimal positioning of reflecting optical devices by an all optical switch in an optically-connected system of a computing environment by at least one processor device, the computer program product comprising a non-transitory computer-readable storage medium having computer-readable program code portions stored therein, the computer-readable program code portions comprising:
    a first executable portion that uses optical power readings taken from an optimal monitoring module that are transmitted to the all optical switch for optimal positioning of a reflecting optical device in order to produce maximum optical output power; and a second executable portion that transmits the optical power readings to an optical switch controller using an optical control loop function; wherein the reflecting optical device is a microelectromechanical (MEMS) mirror and the optically-connected system is one of an optically-connected circuit network system and an electrical circuit system and the optimal monitoring module is included in each one of a plurality of optical transceivers and optical receivers; and a third executable portion for aggregating the optical power readings of each of a plurality of optical transceivers and optical receivers prior to transmitting the optical power readings to the all optical switch, wherein each of the optical power readings taken by each of the plurality of optical transceivers and optical receivers are periodically performed.

12. The computer program product of claim 11, further including a fourth executable portion that initially sets the reflecting optical device in an optimal position for producing the maximum optical output power.

13. The computer program product of claim 12, further including a fifth executable portion that performs one of: detecting the reflecting optical device is no longer in the optimal position for producing the maximum optical output power based on a plurality of factors, wherein the plurality of factors include at least temperature, an input optical power-to-output optical power ratio, movement of the reflecting optical device, and a bit-error ratio (BER), and readjusting the reflecting optical device to be in the optimal position for producing the maximum optical output power.

14. The computer program product of claim 11, further including a third executable portion that monitors optical power levels at one of a plurality of time intervals for detecting whether an input optical power-to-output optical power ratio has fallen below an optical power threshold.

15. The computer program product of claim 11,
further including a third executable portion that performs:
using the optical power readings with a positioning function for calculating the optimal positioning upon accepting a request to connect at least one input port to at least one output port for producing maximum optical output power.

* * * * *